May 12, 1964   N. H. BARKER ETAL   3,133,238
ELECTRICAL CAPACITOR CONSTRUCTION TO REDUCE SHOCK HAZARD
Filed Sept. 26, 1960   2 Sheets-Sheet 1

Inventors,
Norman H. Barker,
Frederick W. Grahame,
by Sidney Greenberg
Their Attorney.

May 12, 1964  N. H. BARKER ETAL  3,133,238
ELECTRICAL CAPACITOR CONSTRUCTION TO REDUCE SHOCK HAZARD
Filed Sept. 26, 1960  2 Sheets-Sheet 2
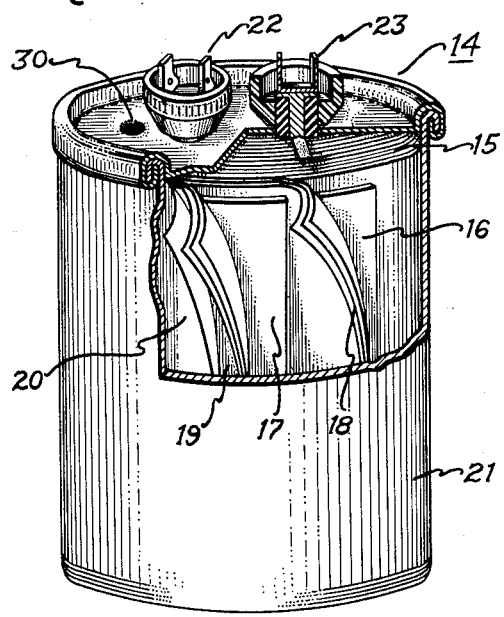
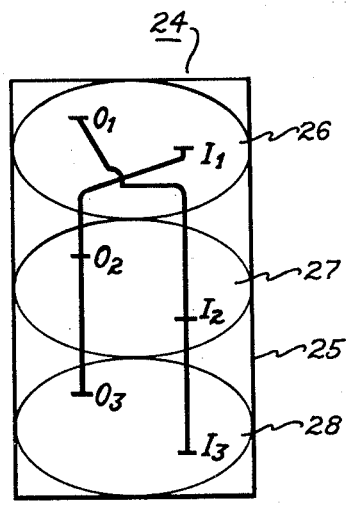
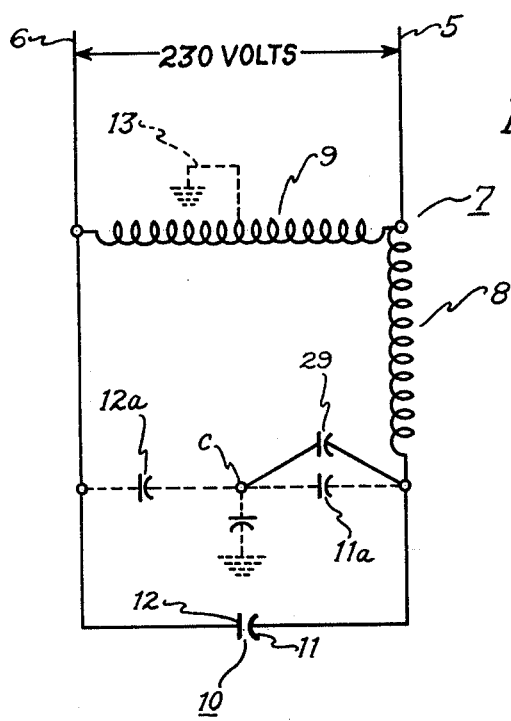
Inventors,
Norman H. Barker,
Frederick W. Grahame,
by Sidney Greenberg
Their Attorney.

United States Patent Office 3,133,238
Patented May 12, 1964

3,133,238
ELECTRICAL CAPACITOR CONSTRUCTION TO REDUCE SHOCK HAZARD
Norman H. Barker, South Glens Falls, and Frederick W. Grahame, Fort Edward, N.Y., assignors to General Electric Company, a corporation of New York
Filed Sept. 26, 1960, Ser. No. 58,307
16 Claims. (Cl. 318—220)

The present invention relates to electrical capacitors, and more particularly to electrical capacitors of the type employed for appliances having electrical motors.

In making electrical appliances of the above type, e.g., air-conditioning equipment, refrigerators, dryers, heaters, and the like, it is necessary that leakage current from the appliances be kept to a minimum to avoid the potential hazard of electrical shock to persons coming into contact with the appliance, and possible corrosion effects resulting from leakage currents. A substantial amount of such leakage current normally originates from the capacitors which are used with the appliance motor for such purposes as increasing its starting torque, reducing the operating current and improving the power factor. In the past, leakage current from the capacitor has usually been reduced by wrapping the capacitor with moisture-proof insulation or by placing a relatively thick dielectric wrapper around the capacitor roll inside the capacitor case so as to reduce the capacitance between the capacitor roll and its metal case. These remedies, however, are not entirely satisfactory, due to the relatively costly processes entailed, and in the latter case to the wasteful use of the space inside the capacitor which could otherwise be employed for increasing the available capacity for the same size of unit.

It is an object of the present invention to provide a means and method for reducing the leakage currents from capacitors of the above type which avoid the disadvantages of the prior type arrangements and methods employed for the same purpose. It is another object of the invention to provide a means and method for proper connection of electrical capacitors into electrical apparatus circuits to minimize leakage current therefrom.

It is another object of the invention to reduce leakage current from capacitors by relatively slight changes in the structure of the capacitors.

It is still another object of the invention to reduce leakage current from multiple-section capacitors, by appropriate interconnection of the capacitor sections.

It is a specific object of the invention to provide reduced leakage current from capacitors to conductive surfaces exterior thereto, including its own metal case, by adjusting the capacitance between the capacitor section and the exterior conductive surface.

Other objects and advantages will become apparent from the following description and appended claims.

With the above objects in view, the present invention relates in general to a means and method for controlling the capacitances from the electrodes of a capacitor to the metal case of the capacitor (or other conductive member in the vicinity) so that the leakage current from the capacitor to ground is at a minimum.

More specifically, the invention relates to an electrical circuit having a capacitor enclosed in a conductive casing and having at least a pair of electrodes of opposite polarity therein connected to the circuit, the circuit being such as to result in a predetermined ratio of voltage from one capacitor electrode to ground to the voltage of the other capacitor electrode to ground, and means to provide for a ratio of capacitance of said one electrode to the case to the capacitance of the other electrode to case which is inverse to said predetermined ratio of voltage.

In a preferred embodiment, the means for providing the above ratio of capacitances is achieved in a wound type capacitor comprising a pair of electrode foils separated by dielectric sheets by extending the length of the inside foil at its outer end a predetermined amount beyond the outer end of the outside foil so as to increase the capacitance between the inside foil to case to provide the above-described ratio of capacitances.

Other embodiments of the invention are described in detail hereinafter.

The invention will be better understood from the following description taken in conjunction with the accompanying drawings in which:

FIG. 3 is an elevational view partly broken away of a wound type capacitor constructed in accordance with an embodiment of the invention;

FIG. 4 diagrammatically shows another embodiment of the invention involving a multiple-section capacitor; and FIG. 5 shows a circuit diagram of a motor and capacitor illustrating another embodiment of the invention.

Figure 1:
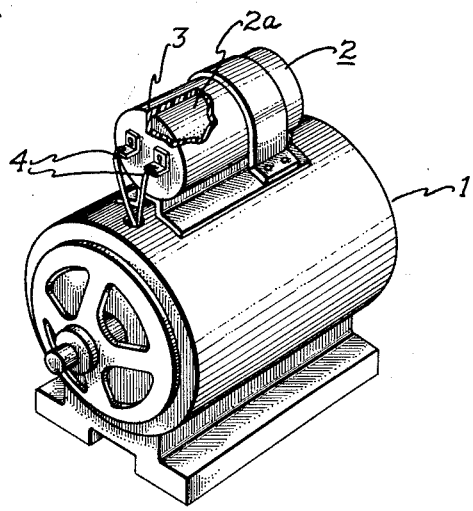
FIG. 1 is a perspective view of an arrangement of an electrical motor and a capacitor therefor wherein the present invention is applicable.
Figure 2:
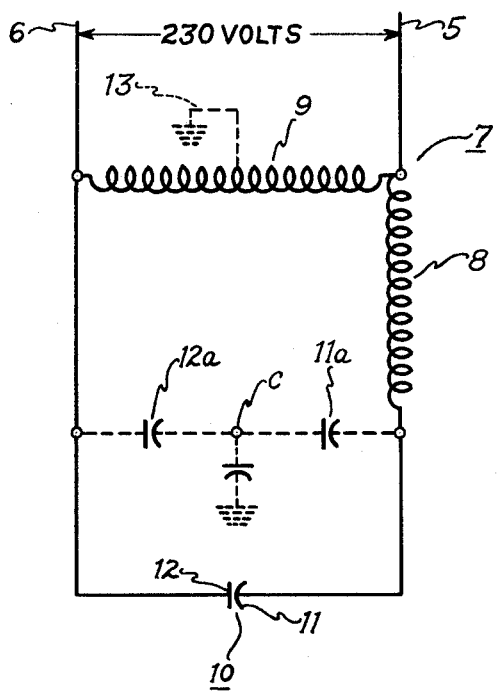
FIG. 2 shows a typical circuit arrangement including a motor and capacitor therefor to which the invention is applicable.

Referring now to the drawings, and particularly to FIGS. 1 and 2, there is shown an electric motor 1 of the type conventionally employed in electrical appliances such as air-conditioners, referigerators, freezers, dryers, and the like, which normally operate on a 230 volt A.C. supply. Mounted on the housing of motor 1 by any suitable means is a capacitor 2 conventionally formed of a rolled capacitor section 2a enclosed in a metal case 3 and connected by means of leads 4 to motor 1. The capacitor may, in other applications, be mounted separate from the motor housing. FIG. 2 shows the circuit connections of the above-described motor and capacitor combination, and as illustrated therein in conventional form, the circuit comprises a 230 volt A.C. supply line with conductors 5 and 6, a motor 7 comprising a start winding 8 in series with the line and a run winding 9 in parallel with the line and capacitor 10 comprising electrodes 11 and 12 in series with start winding 8. Capacitance 12a represents the capacitance between electrode 12 and case C, and capacitance 11a represents the capacitance between electrode 11 and case C. The invention is particularly applicable to such single-phase, three-wire, 230 volt circuits wherein the line has a mid-point grounded, and the mid-point of run winding 9 is thus effectively at ground potential, as indicated by dotted line 13. Case C is shown grounded through a capacitance constituted, for example, by a paint film between the case and the motor housing, or it may be grounded by direct connection.

Capacitor 2 is typically formed of a pair of metal foil electrodes, such as aluminum, separated by insulating sheets, such as kraft paper, impregnated with a dielectric material and convolutely wound into a compact roll. In conventional constructions, the two electrode foils are practically co-extensive in length. In capacitors of the above-described construction, there are, in addition to the main capacitance between the electrode foils, capacitances between the respective foils and the metal capacitor case, as indicated by capacitances 11a and 12a in FIG. 2. These latter capacitances are the source of leakage current from the capacitor to other conductive objects and to ground. The amount of leakage current will depend upon the capacitances between the capacitor electrodes and ground, and on the voltage applied between the electrodes and ground.

It was recognized in the course of arriving at the present invention that the capacitance between the capacitor case and the foil nearest it (i.e., the outside foil) is greater than the capacitance between the inside foil and the case, and therefore, at a specified voltage, there will be greater leakage current from the outside foil than from the inside foil. It can be shown that in the circuit described the leakage current from one electrode will oppose the leakage current from the other electrode and the resulting or actual leakage from the capacitor will be the excess of one leakage current over the other.

In accordance with the invention, we have found that by properly balancing the capacitances of the respective electrodes to the case with respect to the voltages from the electrodes to ground, it is possible to substantially reduce or eliminate entirely the leakage current from the capacitor.

Since the voltages to ground from the respective electrodes will rarely be equal in capacitor motor circuits such as shown, the proper balancing of capacitances from the capacitor electrodes to case contemplated by the invention will not usually be such that the capacitances are equal. To properly adjust the capacitances to give the minimum net leakage from any particular capacitor motor circuit, the ratio of the capacitances from the respective electrodes to case is made inverse to the ratio of the voltages from the corresponding electrodes to ground in such circuit.

To take a specific case by way of example, assume that in a circuit such as in FIG. 2 the voltage to ground from electrode 11 is 255 volts and from electrode 12 to ground is 115 volts, a condition which occurs when the voltage applied to the capacitor is 370 volts.

To reduce the leakage current to a minimum in accordance with the invention, the capacitances from the respective electrode foils to the case are so adjusted that the ratio of capacitance from electrode 12 to the case with respect to the capacitance of electrode 11 to the case, is about $$\frac{255}{115}$$

that is, the inverse of the ratio of voltages of the respective electrodes to ground. In most cases, in order to achieve the necessary ratio, the capacitance of electrode 11 to case must be increased, for reasons that will appear hereinafter.

The necessary adjustment of the capacitances may be achieved in a variety of ways. FIG. 3 shows one embodiment as applied to a roll type capacitor. The capacitor 14 comprises a wound roll section 15 composed of an inside foil 16 and an outside foil 17 separated from each other by one or more insulating sheets 18, 19 between their adjacent surfaces, the roll being wrapped with an insulating sheet 20 if so desired and being enclosed within a metal case 21. Terminals 22 and 23 are connected by conductive leads to the respective electrode foils. As shown, the outer end of inside foil 16 adjacent the case extends beyond the corresponding end of the outside foil 17, the additional length of foil 16 so provided being a predetermined amount depending upon the amount it is desired to increase the capacitance of the inside foil to the case to accord with the above-described relationship between capacitances and voltages.

In connecting capacitor 14 into a motor circuit such as shown in FIG. 2, the outside foil 17 will usually as a practical matter be connected to the line side of the motor, that is, in a position corresponding to that of electrode 12. Since in this way the outside foil 17 is connected so as to have the lower voltage to ground, the leakage current is reduced to some extent by this means and the relative change made necessary in capacitance from the respective foils to case in accordance with the invention would be less than required if the inside foil were connected to the line side of the motor. For this purpose, indicia such as a painted dot 30 (FIG. 3) is provided on the capacitor case (or bushing) to identify the terminal of the outside foil to facilitate the proper connection.

However, it is not intended to limit the scope of the invention to the arrangement wherein the outside foil is connected to the line side of the motor, since suitable balancing of capacitances can be carried out even if the inside foil is connected to the line side of the motor. In this connection, it will be understood that the terms "outside foil" and "inside foil" as used herein may be broadly intepreted respectively to mean electrodes of higher and lower capacitances to case, since the invention obviously is applicable to type of capacitors other than of rolled form, as, for example, stack type, and electrodes in such other types may not necessarily correspond to the outside and inside position designations used above.

Tests were conducted to compare the leakage current properties of two groups of ten capacitors each, the capacitors in group 1 being standard 20.0 mfd. capacitors with both foils the same length and each having an outer complete turn 7⅛ inches in length, while the capacitors in group 2 were identical to those of group 1 except that the inner foil extended 2⅗₁₆ inches beyond the outer foil. Under conditions where 115 volts were applied between the outer foil to ground and 255 volts between the inner foil to ground, it was found that the leakage current in the group 1 capacitors from the case to ground average 75 microamperes, while that in the group 2 capacitors averaged 14 microamperes, the latter thus constituting more than a five-fold improvement.

In the situation where the capacitor unit comprises a plurality of separate capacitor sections within a case, the balancing of capacitances in accordance with the principles of the invention may be accomplished by a somewhat different means, namely, by the proper interconnection of the inner and outer foils from section to section in the capacitor unit, or by the above method of varying the lengths of the foils of the individual capacitor sections, or by a combination of such methods. For example, in the case where three capacitor sections are present in the capacitor unit, the proper balancing may require that the outer foils of two of the sections be interconnected with the inner foil of the third section. Such an arrangement is diagrammatically shown in FIG. 4 wherein a capacitor unit 24 comprises a metal case 25 containing capacitor sections 26, 27, 28, each composed of a wound roll of a pair of interwound foils with insulating sheets therebetween, and each having inside and outside foil terminals I and O as shown. In the case illustrated, the inside foil terminals $I_2$ and $I_3$ are interconnected with outside terminal $O_1$, and $I_1$, $O_2$, and $O_3$ are similarly interconnected. Such an interconnection would result in less leakage current to the case from the capacitor unit, when connected such that the ratio of capacitance from foils to case is in inverse ratio to the voltage from the respective foils to ground, by providing a better balance between the capacitances from the foils to case than would exist if all the outside foils and all the inside foils were respectively interconnected as in conventional practice. Any imbalance which is not corrected by such selective interconnection of the capacitor section terminals can be further reduced by proper variation of the lengths of the foils of one or more of the sections. It will be understood, of course, that proper balancing does not necessarily mean equalization of the capacitances to case from the respective sets of interconnected foils, but rather the adjusting of the ratios of these capacitances to the voltages to ground from the respective sets of foils in accordance with the relationship previously stated.

A further means to achieve proper balancing of capacitances in a single or multiple capacitor unit which may be employed in accordance with the invention, either alone or in conjunction with either or both of the above-described methods, is the provision of a separate capacitor connected between the inside foil (or foil of insufficient capacitance to case) and the case to the main capacitor unit in order to increase the capacitance of the foil to case. Such an arrangement is illustrated in the circuit diagram of FIG. 5. In the diagram, which represents essentially the same capacitor motor circuit shown in FIG. 2, there is provided in this embodiment an additional capacitor 29 connected between the terminal of electrode 11 and case C to increase the capacitance therebetween for proper balancing of capacitances. In practice, the additional capacitor 29 will usually be outside the capacitor, but if desired, it may be located within the case.

Although the invention has been described mainly in connection with mettal cased capacitors and reference is made above to capacitances from the electrodes to case, it will be understood that the principles of the invention are applicable to other types of capacitors wherein the capacitor casing is non-metallic but where there is still a problom of current leakage from the capacitor electrodes to an exterior conductive member in the vicinity of the capacitor, such as the metal housing of the motor on which the capacitor is mounted. The capacitor may also be mounted on or near other metal housing other than the motor enclosure. Hence, the references above to capacitance to case may also be interpreted in the appropriate situation to mean the capacitance to such other exterior conductive member.

While the present invention has been described with reference to particular embodiments thereof, it will be understood that numerous modification may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor having inner and outer foils enclosed within a metal case, said inner foil being extended beyond said outer foil so as to minimize the leakage current between said case and ground.

2. An electrical capacitor having inner and outer foils enclosed within a metal case, said inner foil being extended beyond said outer foil so as to produce a predetermined ratio of capacitances to case of said foils for minimizing leakage current between said case and ground.

3. An electrical capacitor having inner and outer foils enclosed within a metal case, said inner foil being extended beyond said outer foil so as to equalize the respective capacitances to case of said foils for minimizing leakage current between said case and ground.

4. An electrical capacitor comprising a pair of inner and outer electrode foils having an intervening dielectric sheet material wound into a roll, a conductive case containing said wound roll, said capacitor when connected into an electrical circuit having a predetermined ratio of voltage from one capacitor electrode to ground to the voltage of the other capacitor electrode to ground, said inner electrode foil extending at its outer end beyond the end of said outer electrode foil an amount to provide for a ratio of capacitance of said one electrode foil to the case to the capacitance of the other electrode foil to case which is substantially inverse to said predetermined ratio of voltage.

5. An electrical capacitor comprising a pair of electrode foils of opposite polarity interwound with a dielectric material therebetween so as to provide an inside foil and an outside foil, a conductive case enclosing said wound capacitor roll, said capacitor when connected into an electrical circuit, having a voltage from the inside foil to ground which is larger than the voltage from the outside foil to ground, said inside foil extending at its outer end beyond the outer end of the outside foil an amount such that the capacitance between the inside foil and the case is less than the capacitance between the outside foil and case, the ratio of capacitance between the inside foil to case to the capacitance of the outside foil to case being substantially equal to the ratio of the voltage of the outside foil to ground to the voltage of the inside foil to ground.

6. An electrical capacitor comprising a pair of electrode foils of opposite polarity interwound with a dielectric material therebetween so as to provide an inside foil and an outside foil, a conductive case enclosing said wound capacitor roll, said capacitor when connected into an electrical circuit having a voltage from the inside foil to ground which is less than the voltage from the outside foil to ground, said inside foil extending at its outer end beyond the outer end of the outside foil an amount such that the capacitance between the inside foil and the case is greater than the capacitance between the outside foil and case, the ratio of the capacitance between the inside foil to case to the capacitance between the outside foil to case being substantially equal to the ratio of the voltage of the outside foil to ground to the voltage of the inside foil to ground.

7. An electrical capacitor comprising a pair of electrode foils of opposite polarity interwound with a dielectric material therebetween so as to provide an inside foil and an outside foil, a conductive case enclosing said wound capacitor roll, said capacitor when connected into an electrical circuit, having a voltage from the inside foil to ground which is substantially equal to the voltage from the outside foil to ground, said inside foil extending at its outer end beyond the outer end of the outside foil an amount such that the capacitance between the inside foil and case is substantially equal to the capacitance between the outside foil and the case.

8. An electrical capacitor unit comprising a conductive case and a plurality of capacitor sections within said conductive case, each capacitor section comprising a pair of electrodes of opposite polarity separated by insulating material, said electrical capacitor when connected in a circuit having a predetermined ratio of voltages from the electrodes of one polarity to ground with respect to the voltage from the electrodes to the other polarity to ground, said electrodes of respective polarity being interconnected so as to provide a ratio of total capacitance of the electrodes of said one polarity to case to the total capacitance of the electrodes of the other polarity to case which is substantially inverse to said predetermined ratio of voltages.

9. An electrical capacitor unit comprising a conductive case, a plurality of capacitor sections within said conductive case, each capacitor section comprising a pair of electrodes of opposite polarity separated by insulating material, said electrical capacitor being adapted to be connected in a circuit having a predetermined ratio of voltages from the electrodes of one polarity to ground to the voltage from the electrodes of the other polarity to ground, said electrodes of respective polarity being interconnected so as to provide a ratio of total capacitance of electrodes of said one polarity to case to the total capacitance of the electrodes of the other polarity to case which is substantially inverse to said predetermined ratio of voltages, the electrodes of the plurality of capacitor sections being so interconnected that each polarity group includes electrodes of different structural position in their respective capacitor sections.

10. In an electrical circuit, an electrical capacitor and a conductive member adjacent thereto, said capacitor having a pair of electrodes of opposite polarity therein connected to said circuit, and having a predetermined ratio of voltage from one capacitor electrode to ground to the voltage of the other capacitor electrode to ground, and means comprising a second capacitor connected between one of said electrodes and the conductive member to provide for a ratio of capacitance of said one electrode to said conductive member to the capacitance of the other electrode to said conductive member which is substantially inverse to said predetermined ratio of voltage.

11. An electrical capacitor comprising a pair of electrode foils of opposite polarity interwound with a dielectric material therebetween so as to provide an inside foil and an outside foil, a conductive case enclosing said wound capacitor roll, said capacitor when connected into an electrical circuit, having a voltage from the inside foil to ground which is larger than the voltage from the outside foil to ground, and means comprising a second capacitor connected between said inside foil and the case to provide for a ratio of the capacitance between said inside foil and case to the capacitance of the outside foil to case which is substantially equal to the ratio of the voltage from the outside foil to ground to the voltage of the inside foil to ground.

12. An electrical capacitor comprising a pair of electrode foils of opposite polarity interwound with a dielectric material therebetween so as to provide an inside foil and an outside foil, a conductive case enclosing said wound capacitor roll, said capacitor when connected into an electrical circuit, having a voltage from the inside foil to ground which is less than the voltage from the outside foil to ground, and means comprising a second capacitor connected between said inside foil and the case to provide a ratio of capacitance of the inside foil to the case to the capacitance of the outside foil to case which is substantially equal to the ratio of the voltage of the outside foil to ground to the voltage of the inside foil to ground.

13. An electrical circuit arrangement comprising a source of electrical current, an induction motor connected to said source of electrical current and having a start winding and a run winding, an electrical capacitor arranged in series with said start winding of said induction motor, said capacitor comprising a pair of electrodes of opposite polarity separated by dielectric material and inclosed in a conductive case, said circuit being such as to result in a predetermined ratio of voltage from one capacitor electrode to ground to the voltage of the other capacitor electrode to ground, and means to provide for a ratio of capacitance of said one electrode to the case to the capacitance of the other electrode to the case which is substantially inverse to said predetermined ratio of voltage.

14. In an electrical supply circuit having a grounded neutral, an electrical capacitor comprising a pair of electrodes of opposite polarity separated by dielectric material, the capacitor being connected across the supply circuit and having a predetermined ratio of voltage from one electrode to ground to the voltage of the other electrode to ground, the capacitor having its electrodes adjacent a conductive surface, and means providing a ratio of capacitance of said one electrode to the conductive surface to the capacitance of the other electrode to the conductive surface which is substantially inverse to said predetermined ratio of voltage.

15. In an electrical supply circuit having a grounded neutral, an electrical capacitor comprising a pair of electrodes of opposite polarity separated by dielectric material and enclosed in a conductive casing, the capacitor being connected across the supply circuit and having a predetermined ratio of voltage from one capacitor electrode to ground to the voltage of the other electrode to ground, and means providing a ratio of capacitance of said one electrode to said casing to the capacitance of the other electrode to said casing which is substantially inverse to said predetermined ratio of voltage.

16. A device having, in combination, an electrically conductive casing normally intended to be at ground potential, said device being fully capable of operation with said casing insulated from ground, at least two electrodes electrically insulated from said casing and normally charged respectively with different potentials to ground, there being capacitance leakage currents between said casing and said electrodes which have a finite resultant value for charging said casing to a potential different from ground potential when said casing is insulated from ground, and auxiliary capacitive means effectively connected between said casing and at least one of said electrodes for producing compensatory current therebetween which is equal in magnitude and opposite in phase to said finite resultant leakage current, whereby said casing is maintained substantially at ground potential although insulated therefrom.

References Cited in the file of this patent
UNITED STATES PATENTS

| | | |
|---|---|---|
| 2,178,945 | Whitby | Nov. 7, 1939 |
| 2,242,343 | Buchanan | May 20, 1941 |
| 2,549,265 | Trant | Apr. 17, 1951 |
| 2,930,714 | Netherwood | Mar. 29, 1960 |
| 3,049,651 | Adelson | Aug. 14, 1962 |